Jan. 11, 1938.  W. S. SAUNDERS  2,104,772
STORAGE BATTERY INSTALLATION
Filed Aug. 21, 1936  2 Sheets-Sheet 1
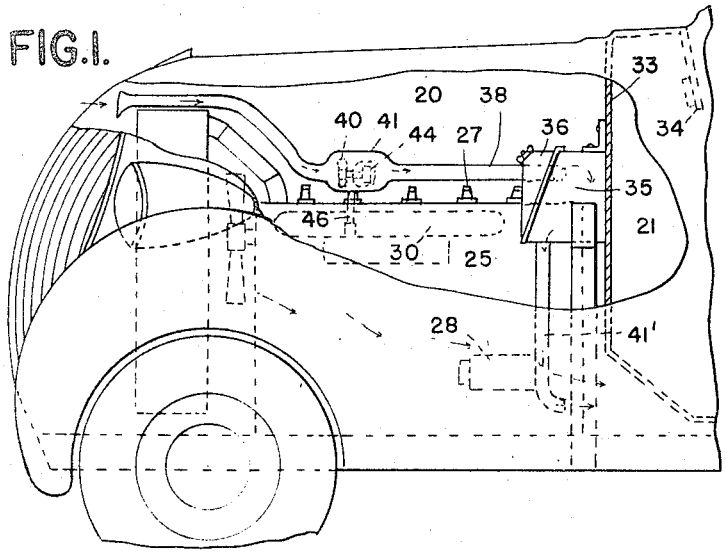
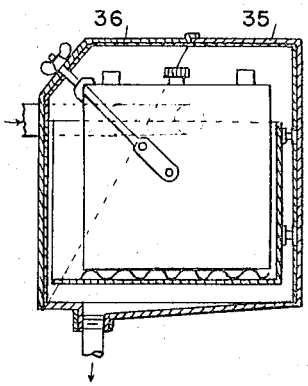
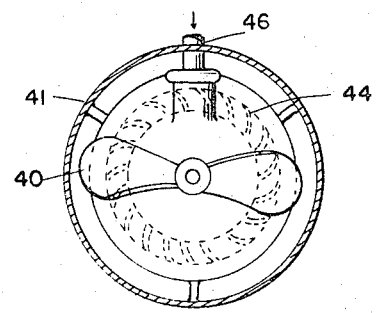
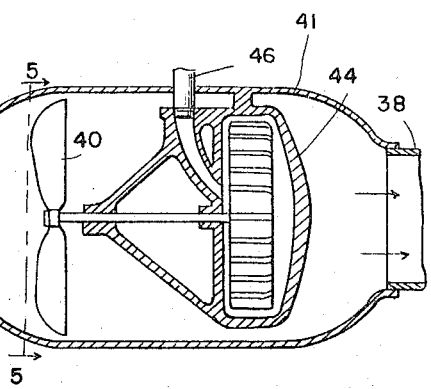
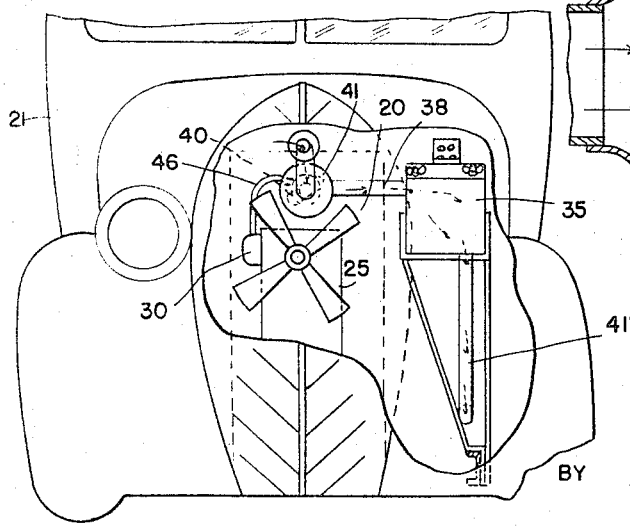
INVENTOR
WALTER S. SAUNDERS
BY
ATTORNEYS Jan. 11, 1938.  W. S. SAUNDERS  2,104,772
STORAGE BATTERY INSTALLATION
Filed Aug. 21, 1936  2 Sheets-Sheet 2
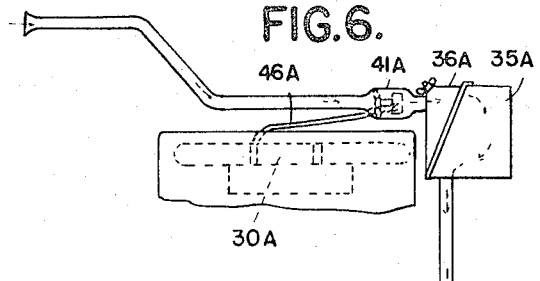
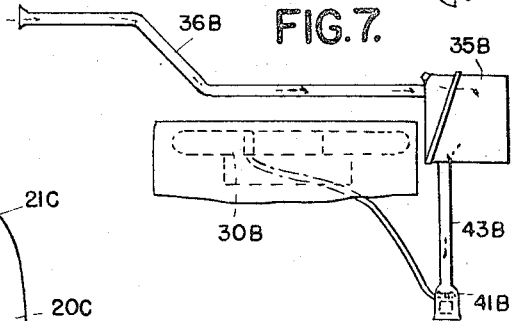
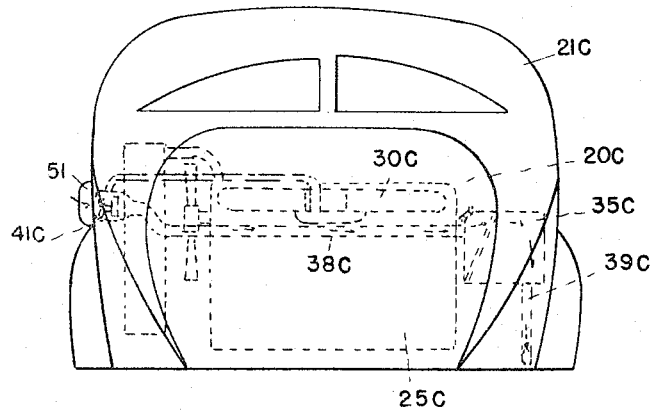
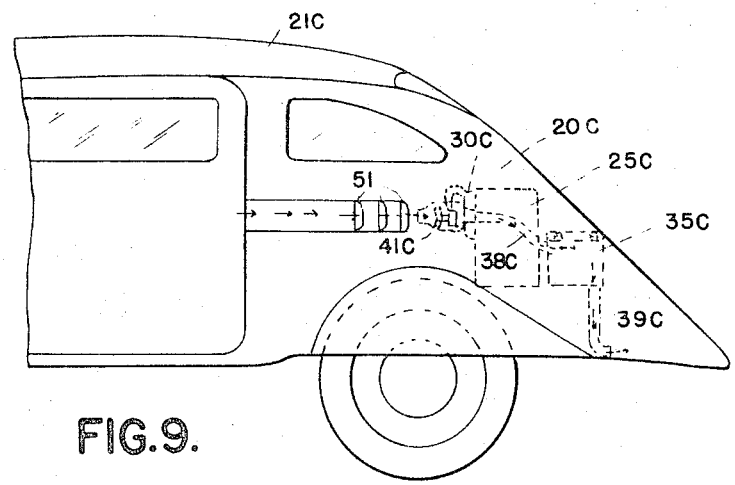
INVENTOR
WALTER S. SAUNDERS
BY
ATTORNEYS Patented Jan. 11, 1938

2,104,772

UNITED STATES PATENT OFFICE 2,104,772

STORAGE BATTERY INSTALLATION

Walter S. Saunders, Pontiac, Mich., assignor to The American Forging & Socket Company, Pontiac, Mich., a corporation of Michigan Application August 21, 1936, Serial No. 97,215

4 Claims. (Cl. 180—68.5)

This invention relates to the installation of storage batteries, particularly in automotive vehicles, and aims to provide improved supporting and ventilating means for such battery installations, and to develop further the inventions disclosed in my copending application, Serial No. 64,909, filed February 20, 1936.

An important object of the present invention comprises the provision of improved means for inducing a forced circulation of air through a battery box mounted in close proximity to the engine of the vehicle, the arrangement being such as to maintain the temperature of the battery sufficiently low despite the proximity of the engine and the waste heat it develops.

A further object comprises the provision of improved means for utilizing relatively cool air for such ventilating purposes, and for obtaining or intercepting such air at a point outside and away from the engine, and away from all elements heated thereby, thus delivering air to the battery box at a temperature as low as possible.

Another object is the incorporation of improved draft-inducing means for forcing air through the battery box, including blower means operable in response to operation of the engine.

Other objects and advantages will be apparent from the following description, wherein reference is made to the accompanying drawings illustrating preferred embodiments of my invention, and wherein similar reference numerals designate similar parts throughout the several views.

In the drawings:

Figure 1 is a fragmentary diagrammatic side elevational view of the front portion of a motor vehicle provided with storage battery installation incorporating the principles of the present invention.

Figure 2 is a fragmentary front elevational view of the same, partly broken away.

Figure 3 is a cross sectional view of the battery box.

Figure 4 is an enlarged diametric section of the draft fan.

Figure 5 is a cross section thereof taken substantially on the line 5—5 of Figure 4.

Figures 6 and 7 are diagrammatic views showing schematically further modifications.

Figures 8 and 9 are diagrammatic rear and side elevational views respectively of the rear portion of a motor vehicle having a rear mounted engine and provided with a battery installation incorporating the invention in somewhat modified form.

In Figure 1, reference character 20 designates the engine compartment and 21 the passenger compartment of a motor car, illustrated as provided with an engine 25 of the internal combustion type. The engine incorporates electrically operable elements including spark plugs 27 and the electric starter 28. The engine is also provided with an intake manifold 30. Dash panel 33 separates the engine compartment from the passenger compartment, and the battery box 35 is supported upon the dash in a position close to the engine and to the instrument panel 34.

The construction of the battery box, and the manner of attachment of the cover 36, which is removable from inside the engine compartment, are best shown in Figure 3. The air inlet tube 38 may be formed partly or entirely of flexible material such as rubber, and may, as illustrated, open directly into one end of the box. Such tube extends forwardly to a position in front of the radiator and engine, to intercept and deliver to the battery box air which has not been heated by the waste heat developed by the engine.

In the air inlet tube is arranged a fan 40 housed in a casing section constituting an enlarged portion 41 of the inlet tube. The fan is drivable by an air motor 44 of the turbine type, connected to and operable by the vacuum developed in the intake manifold 30, the connecting pipe being designated 46. The fan 40 will be seen to be positively driven by the vacuum motor 44 so long as the engine is in operation, and to act to force air through the battery box. The air discharge tube 41' is shown as extending downwardly to a position below the engine and in the air stream thereabout.

Figures 6 and 7 diagrammatically illustrate modifications generally similar but involving different placements of the draft fan. In Figure 6 the fan housing 41A is shown directly secured to the cover section 36A of the battery box 35A, and the vacuum motor is similarly connected to the intake manifold, designated 30A, by a pipe 46A.

The modification shown in Figure 7 is also generally similar, but the draft fan 41B is disposed in the air discharge conduit 43B, while the air inlet conduit 36B projects forwardly to a position adapting it to intercept unheated air, the inlet and outlet conduits being similarly connected to the battery box 35B, and the fan 41B likewise operable by the reduced pressure developed in the intake manifold 30B.

In the modification shown in Figures 8 and 9 the engine compartment 20C is located at the rear of the vehicle 21C, and the engine 25C is disposed crosswise therein. The battery box 35C is mounted behind the engine and at one end thereof, and forwardly opening air inlet louvers 51 are formed in the side of the body, in such position as to scoop unheated air from the air stream passing the vehicle, while directly inside the louvers is located a draft fan 41C operable by the vacuum developed in the intake manifold 30C of the engine, to assist the inflow of air to the battery box through inlet conduit 38C. From the battery box, which may be constructed similarly to that described in connection with the first disclosed embodiment, a discharge pipe 39C projects downwardly in suitable position to discharge the air from the battery box at the rear of the vehicle.

What I claim is:

1. In combination with an automotive vehicle incorporating electrically operable elements and including a frame, an internal combustion engine carried by the frame having an intake manifold within which reduced pressure exists during operation of the engine, one or more of said electrically operable elements being appurtenant said engine, a storage battery for supplying current to said electrically operable elements, and ventilated supporting means for said battery comprising a battery enclosure arranged near said engine and having air inlet and outlet portions including an air inlet conduit connected thereto and extending to and having an inlet opening located in a position to intercept air unheated by the vehicle, a draft inducing fan connected to one of said portions, and motor means operable by the reduced pressure in the intake manifold to drive said fan and so induce air circulation through said battery enclosure.

2. Apparatus as set forth in claim 1 in which said draft inducing fan portion and the driving motor means therefor are located in a casing section forming a part of said conduit.

3. Apparatus as set forth in claim 1 in which said fan is carried by said battery enclosure and serves to connect the inlet portion to said inlet conduit.

4. Apparatus as set forth in claim 1 including a discharge conduit connected to said enclosure, said draft fan being connected to said discharge conduit and having a casing forming in effect a section of such conduit.

WALTER S. SAUNDERS.